3,242,682
METHOD FOR SEPARATION OF HYDROCARBONS

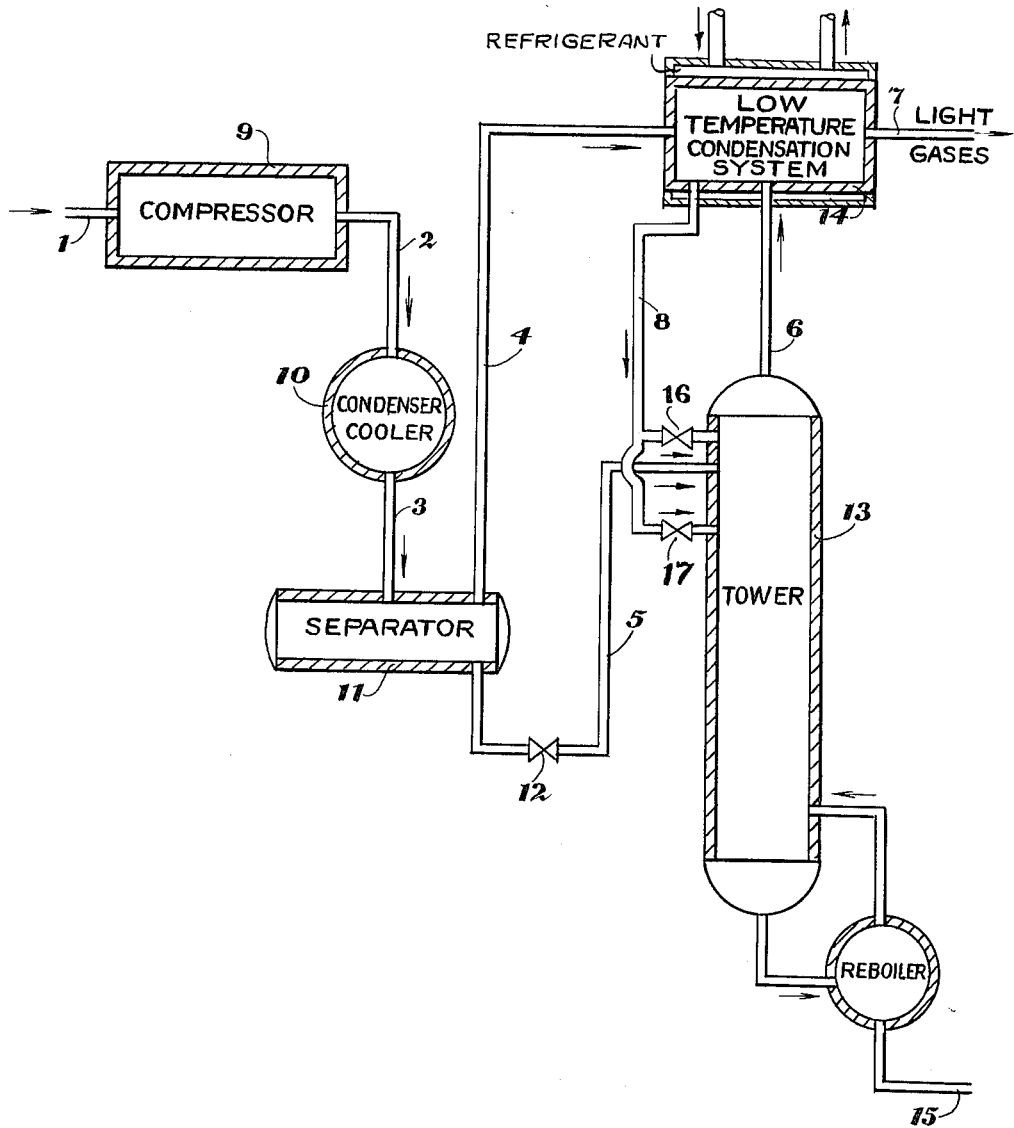

John C. English, Longview, Tex., assignor to Eastman Kodak Company, Rochester, N.Y., a corporation of New Jersey
Filed Sept. 23, 1963, Ser. No. 310,825
4 Claims. (Cl. 62—28)

This invention relates to a separation process and more particularly to a process for separating a gaseous mixture consisting primarily of propane and lighter hydrocarbons and hydrogen into two streams consisting of the light gases such as hydrogen and methane and the $C_2$ and heavier hydrocarbons including ethylene, ethane, propylene and propane.

In part this invention is concerned with the isolation of the $C_2$ and heavier components of a cracked gas. In a more limited respect the invention is concerned with the isolation of the $C_2$ components of a cracked gas.

The known methods of separating the $C_2$ and heavier components of a cracked gas include absorbing the heavier components in a hydrocarbon liquid to separate these components from the lighter ends and then stripping the desired heavier components from the absorption liquid in another tower. It is also known to condense the ethylene, ethane and considerable methane at temperatures as low as —230 F. and then separate the methane by means of low temperature distillation.

These previously known methods involve rather extensive investments in equipment because of the numerous towers and special materials required for the low temperatures involved. It is generally recognized that temperatures substantially below zero degrees Fahrenheit necessitate the use of special materials of construction. The cost of these special materials usually increases when yet lower operating temperatures are employed. Also, it is well known that a given unit of refrigeration becomes more expensive as the temperature at which it is used drops.

It is an object of this invention to provide a process for separating $C_2$ and heavier components from a hydrocarbon-containing mixture without resort to extensive low temperature apparatus requiring expensive construction materials.

Another object of this invention is to provide a process for separating $C_2$ and heavier components from a hydrocarbon containing a mixture with minimum refrigeration requirements. Other objects will be apparent upon consideration of the following discussion.

The objects of this invention are accomplished by providing a method and apparatus for the recovery of the valuable products from cracked gas by making a large part of the separation at temperatures around 0° F. where ordinary mild steel equipment and the usual refrigerants which can be condensed with water can be used. By providing a process which can be carried out for the most part around 0° F., this invention provides the additional advantage of enabling a conventional plant using hydrocarbon absorption oil to be converted to a plant employing the process of the present invention which does not require absorption oil thereby increasing the capacity of the plant while reducing the loss of valuable products and reducing the cost of operation.

According to the present invention, the cracked gases which comprise the feed of the process are compressed to pressures of not more than 850 p.s.i.g. in the lower range of what is conventionally considered high pressure processing. The feed is then partially condensed after preliminary cooling and drying. The partially condensed feed, in which the liquid phase comprises the majority of the heavier ends, is conducted to a separator where the gaseous phase is drawn off and conducted to a special low temperature condensation system. The liquid phase is conducted through an expansion valve to a relatively conventional tower where the lighter and heavier gases are separated and the $C_2$+ constituents withdrawn from the bottom. The lighter gases from the tower are conducted to the low temperature condensation system where this stream and the stream from the separator are subjected to low temperature condensation during which all but the extremely light ends, i.e., hydrogen and methane, are totally condensed. The condensate from the low temperature condensation system is introduced into the tower where the methane remaining in the condensate is separated and again sent to the low temperature condensation system.

The advantage of the present process lies in the fact that only a very small percentage of the $C_2$ and heavier components are allowed to enter the low temperature condensation system with its extreme requirements for refrigeration and materials. This enables the low temperature condensation system to be of a smaller capacity and avoids the use of expensive refrigeration to unnecessarily cool the heavier components. The conventional separation systems allow a large portion of the $C_2$ components to remain in the overhead products entering the low temperature condensation system and this results in the use of large quantities of extremely low temperature refrigeration to separate the $C_2$ components from the methane and lighter gases. In this invention only a small part of the $C_2$ components are allowed to enter the low temperature condensation system and these are returned, with a substantial amount of methane, to the fractionation tower. The end products of the present process are two streams, one consisting of the methane and lighter gases and the other consisting of the $C_2$ and heavier constituents. The $C_2$ constituents can be separated from the heavier constituents in a conventional manner at a much higher and more advantageous temperature than that necessary for separation from methane and lighter elements.

From the drawing it will be seen that the apparatus consists of a compressor 9, a cooler-condenser 10 and a separator 11 through which all of the material of the feed stream which is introduced to condenser 9 through pipe 1 passes. After the pressure is raised to about 800 p.s.i.g. in compressor 9, the material passes through pipe 2 to the cooler-condenser 10 where the temperature is lowered to approximately 0° F. The uncondensed gases are then conducted from separator 11 through pipe 4 to the low temperature condensation system 14 where all of the $C_2$ and heavier components and some of the methane and lighter components are condensed. The liquid phase is expanded through valve 12 to a pressure of not more than approximately 600 p.s.i.g. and conducted through conduit 5 to tower 13. At these pressures it is below the commonly recognized high pressure range and may be processed in conventional apparatus. In tower 13 the gases are fractionated in the normal manner with the methane and lighter ends being taken off with a minimum of the $C_2$ and heavier constituents through pipe 6 and conducted to low temperature condensation system 14 where all of the $C_2$ and heavier constituents are condensed. Methane and hydrogen are withdrawn as the uncondensed gases of the low temperature condensation system through pipe 7. Only a very small percentage of the ethylene and heavier components are withdrawn with the uncondensed gases. All of the condensate from the low temperature condensation system 14, which includes the condensate from the vapor stream from separator 11 and the condensate from the overhead stream from tower 13 is combined and returned to tower 13 through conduit 8. Conduit 8 can be vented into tower 13 through either of valves 16 and 17 at a plate position appropriate the composition and conditions of this recycle above or below the feed position of conduit 5. $C_2$ and heavier components are conducted to a conventional de-ethanizer (not shown) where the $C_2$ constituents would be removed from the remaining $C_3$ and heavier components.

It is evident that the process of the present invention avoids the use of extreme temperature or pressure conditions for a large portion of the incoming stream. The following table indicates quantitively the calculated magnitudes, compositions and conditions of the various streams in the pipes and conduits in one preferred embodiment of the invention.

conducting the uncondensed feed mixture to a low temperature condensation system, conducting the overhead gases from the fractionation tower to the low temperature condensation system, condensing substantially all of the ethane and ethylene in the uncondensed feed mixture and in the overhead gases in the low temperature condensation system, introducing the condensate from the low temperature condensation system into the fractionation tower, withdrawing the uncondensed hydrogen and methane from the low temperature condensation system as a gaseous product stream and withdrawing a substantially hydrogen and methane free liquid product stream from the bottom of the fractionation tower.

TABLE

| Stream | 1 | 2 | 3 | 4 | 5 | 6 | 7 | 8 | 15 |
|---|---|---|---|---|---|---|---|---|---|
| Hydrogen: | | | | | | | | | |
| Mol/hr | 573.96 | 573.96 | 573.96 | 552.25 | 21.71 | 23.71 | 573.9 | 2.0 | .06 |
| Mol percent | 19.0 | 19.0 | 19.0 | 35.6 | 1.5 | 4.7 | 43.6 | .3 | .3 |
| Methane: | | | | | | | | | |
| Mol/hr | 728.02 | 728.02 | 782.02 | 549.15 | 178.87 | 279.38 | 728.0 | 100.51 | .02 |
| Mol percent | 24.1 | 24.1 | 24.1 | 35.3 | 12.2 | 55.5 | 55.3 | 13.6 | .1 |
| Ethylene: | | | | | | | | | |
| Mol/hr | 725.00 | 725.00 | 725.00 | 290.87 | 443.13 | 136.70 | 11.1 | 416.47 | 713.90 |
| Mol percent | 24.0 | 24.0 | 24.0 | 18.8 | 29.6 | 27.1 | .8 | 56.3 | 41.8 |
| Ethane: | | | | | | | | | |
| Mol/hr | 241.67 | 241.67 | 241.67 | 76.14 | 165.53 | 40.85 | 2.0 | 114.99 | 239.67 |
| Mol percent | 8.0 | 8.0 | 8.0 | 4.9 | 11.3 | 8.1 | .2 | 15.5 | 14.0 |
| Propylene: | | | | | | | | | |
| Mol/hr | 290.00 | 290.00 | 290.00 | 35.61 | 254.39 | 12.01 | .6 | 47.02 | 289.40 |
| Mol percent | 9.6 | 9.6 | 9.6 | 2.3 | 17.3 | 2.4 | .1 | 6.4 | 16.9 |
| Propane: | | | | | | | | | |
| Mol/hr | 401.77 | 401.77 | 401.77 | 46.22 | 355.55 | 10.62 | .4 | 56.44 | 401.37 |
| Mol percent | 13.3 | 13.3 | 13.3 | 3.0 | 24.2 | 2.1 | .0 | 7.6 | 23.5 |
| $C_4+$: | | | | | | | | | |
| Mol/hr | 60.42 | 60.42 | 60.42 | 1.76 | 58.66 | .50 | | 2.26 | 60.42 |
| Mol percent | 2.0 | 2.0 | 2.0 | .1 | 3.9 | .1 | | .3 | 3.4 |
| Temperature, °F | | | 0 | 0 | | 0 | 0 | | |
| Pressure, p.s.i.g | | 800 | 800 | 800 | 500 | 500 | | 500 | |
| Total Mol/hr | 3,020.84 | 3,020.84 | 3,020.84 | 1,552.00 | 1,468.84 | 503.77 | 739.64 | 1,316.0 | 1,704.84 |

The values shown in the table assume that common practices are followed in taking advantage of refrigeration credits and energy requirements. For example, the stream in conduit 8 is indicated as being at 0° F. though the condensation temperature in the low temperature condensation system 14 could well be much lower. The table values recognize that the condensate could be employed to cool other streams, such as that in pipe 2. Those skilled in the art will readily recognize other common expedients which will optimize the results obtainable.

The various components of a system utilizing the process of the present invention are conventional units having design requirements understood by those skilled in the art. For the most part, the materials of construction can be ordinary mild steel or other relatively inexpensive material and the usual refrigerants which can be condensed with water can be used. Commercially available materials adapted for use in high pressure and low temperature applications may be used for the limited high pressure and low temperature portions of the process.

Low temperature condensation system 14 can be of any design which condenses substantially all of the $C_2+$ in the streams sent to it and returns the $C_2+$ condensate as a liquid with less methane than is in the stream leaving the top of tower 13.

The invention has been described in detail with particular reference to preferred embodiments thereof, but it will be understood that variations and modifications can be effected within the spirit and scope of the invention as described hereinabove and as defined in the appended claims.

I claim:
1. A method for removing hydrogen and methane constituents from a gaseous feed mixture comprising hydrogen, methane, ethylene, ethane, propylene and propane comprising condensing a substantial portion of the feed mixture, separating the resulting liquid condensate from the uncondensed portion of the feed mixture, expanding the liquid feed mixture condensate to not more than 600 p.s.i.g. and then introducing it into a fractionation tower, conducting the uncondensed feed mixture to a low temperature condensation system, conducting the overhead gases from the fractionation tower to the low temperature condensation system, condensing substantially all of the ethane and ethylene in the uncondensed feed mixture and in the overhead gases in the low temperature condensation system, introducing the condensate from the low temperature condensation system into the fractionation tower, withdrawing the uncondensed hydrogen and methane from the low temperature condensation system as a gaseous product stream and withdrawing a substantially hydrogen and methane free liquid product stream from the bottom of the fractionation tower.

2. A method as set forth in claim 1 in which the feed mixture is compressed to a pressure of not more than 850 p.s.i.g. before being separated into condensate and gaseous portions.

3. A method as set forth in claim 1 in which the feed mixture is cooled to about 0° F. before being separated into condensate and gaseous portions.

4. A method for removing hydrogen and methane constituents from a gaseous feed mixture comprising hydrogen, methane, ethylene, ethane, propylene and propane comprising cooling the gaseous feed mixture to a temperature of about 0° F. under a pressure of about 800 p.s.i.g., separating the resulting liquid condensate from the uncondensed portion of the feed mixture, introducing the liquid condensate into a fractionation tower under a pressure of not more than 600 p.s.i.g., conducting the uncondensed feed mixture to a low temperature condensation system, conducting the overhead gas from the fractionation tower to the low temperature condensation system, condensing substantially all of the ethane and ethylene and heavier constituents of the feed mixture in the uncondensed feed mixture and in the overhead gas in the low temperature condensation system, introducing the condensate from the low temperature condensation system into the fractionation tower, withdrawing the uncondensed hydrogen and methane from the low temperature condensation system as a gaseous product stream and withdrawing a substantially hydrogen and methane free liquid product stream from the bottom of the fractionation tower.

References Cited by the Examiner

UNITED STATES PATENTS

| | | | |
|---|---|---|---|
| 1,073,843 | 9/1913 | Blau | 62—27 X |
| 1,773,012 | 8/1930 | Schuftan | 62—29 |
| 2,067,349 | 1/1937 | Schuftan | 62—40 X |
| 2,222,276 | 10/1940 | Babcock | 62—40 X |

NORMAN YUDKOFF, *Primary Examiner.*

V. W. PRETKA, J. C. JOHNSON, *Assistant Examiners.*